US012146353B2

(12) United States Patent
Houck

(10) Patent No.: US 12,146,353 B2
(45) Date of Patent: Nov. 19, 2024

(54) SECURE STOP ADJUSTABLE DOOR OPENING LIMITER

(71) Applicant: GM GLOBAL TECHNOLOGY OPERATIONS LLC, Detroit, MI (US)

(72) Inventor: Thomas E. Houck, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 107 days.

(21) Appl. No.: 17/887,795

(22) Filed: Aug. 15, 2022

(65) Prior Publication Data

US 2024/0052677 A1 Feb. 15, 2024

(51) Int. Cl.
*E05C 17/20* (2006.01)

(52) U.S. Cl.
CPC .................................. *E05C 17/203* (2013.01)

(58) Field of Classification Search
CPC .......................... E05C 17/203; E05Y 2900/531
See application file for complete search history.

(56) References Cited

U.S. PATENT DOCUMENTS 1,462,872 A * 7/1923 Schmidt ................ E05C 17/203 292/262
1,483,316 A * 2/1924 Seelinger .............. E05C 17/203 292/262
2,147,133 A * 2/1939 Ackerman .............. E05D 5/062 49/398
2,194,287 A * 3/1940 Marsh .................. E05C 17/203 16/82
2,218,372 A * 10/1940 Ackerman ............ E05C 17/203 16/374
2,219,800 A * 10/1940 Allen .................... E05C 17/203 16/86 C
3,051,983 A * 9/1962 Dale ....................... E05C 17/08 292/262
6,105,208 A * 8/2000 Westerdale ........... E05C 17/203 16/334
8,366,175 B2 * 2/2013 Schmitt ................. E05C 17/006 16/86 B
8,480,155 B2 * 7/2013 Rauscher .............. E05C 17/203 296/146.4
9,617,778 B2 * 4/2017 Fukui ...................... E05F 15/73
9,650,824 B2 * 5/2017 Sauerwein .............. E05F 15/53
9,879,463 B2 * 1/2018 Lombrozo .............. E05B 79/20
10,107,020 B2 * 10/2018 Seki ...................... E05C 17/203
(Continued)

*Primary Examiner* — Christine M Mills
*Assistant Examiner* — Matthew J Sullivan
(74) *Attorney, Agent, or Firm* — CANTOR COLBURN LLP

(57) ABSTRACT

A door check system of a vehicle includes a door check assembly having a check body securable to a door of the vehicle, a check link extending through a check body opening of the check body and an adjustment mechanism positioned at a body of the vehicle. The adjustment mechanism includes a housing defining a housing opening, and an adjustment slide positioned in the housing opening and slidable moveable therein. The adjustment slide is secured to the check link. An adjustment feature is secured to the adjustment slide and extends through an adjustment slot in the housing. Moving the adjustment feature along the adjustment slot moves the adjustment slide in the housing opening to change an effective length of the check link.

20 Claims, 4 Drawing Sheets

(56) References Cited

U.S. PATENT DOCUMENTS

| | | | | |
|---|---|---|---|---|
| 10,190,344 | B2 * | 1/2019 | Reddmann | E05C 17/003 |
| 10,487,555 | B2 * | 11/2019 | Wisniewski | E05C 17/203 |
| 10,815,708 | B2 * | 10/2020 | Haeske | E05B 53/005 |
| 11,008,780 | B2 * | 5/2021 | Oxley | E05C 17/203 |
| 11,130,220 | B2 * | 9/2021 | MacArthur | B62D 65/02 |
| 2004/0055110 | A1 * | 3/2004 | Breed | E05C 17/203<br>16/82 |
| 2019/0040664 | A1 * | 2/2019 | Seki | E05C 17/203 |
| 2019/0112849 | A1 * | 4/2019 | Cumbo | E05C 17/003 |
| 2019/0292818 | A1 * | 9/2019 | Cumbo | E05B 81/77 |

* cited by examiner

SECURE STOP ADJUSTABLE DOOR OPENING LIMITER

INTRODUCTION

The subject disclosure relates to the art of vehicles and, more particularly to doors and door opening devices for vehicles.

Vehicles typically utilize a door opening limiter, also known as a door check, that limits a travel of the door on its hinges when the door is opened. In some conditions, such as a high-wind condition, the wind may force the door quickly to the full travel position, and into an obstruction such as an adjacent vehicle resulting in vehicle damage. Thus, it is desired to adjust the full travel position in order to avoid such impacts and damage. In other instances, the occupant's seating position is such that it is difficult to reach the door to close it when in the full travel position. Thus, it is also desired to adjust the full travel position based on seating position to create an improved ergonomic situation when closing the door.

SUMMARY

In one embodiment, a door check system of a vehicle includes a door check assembly having a check body securable to a door of the vehicle, a check link extending through a check body opening of the check body and an adjustment mechanism positioned at a body of the vehicle. The adjustment mechanism includes a housing defining a housing opening, and an adjustment slide positioned in the housing opening and slidable moveable therein. The adjustment slide is secured to the check link. An adjustment feature is secured to the adjustment slide and extends through an adjustment slot in the housing. Moving the adjustment feature along the adjustment slot moves the adjustment slide in the housing opening to change an effective length of the check link.

Additionally or alternatively, in this or other embodiments an adjustment actuator is operably connected to the adjustment feature to urge movement of the adjustment feature along the adjustment slot.

Additionally or alternatively, in this or other embodiments a linkage connects the adjustment actuator to the adjustment feature.

Additionally or alternatively, in this or other embodiments the linkage is positioned on an output arm of the adjustment actuator.

Additionally or alternatively, in this or other embodiments a door controller is operably connected to the adjustment actuator to control operation of the adjustment actuator.

Additionally or alternatively, in this or other embodiments a door sensor detects a distance between the door and an obstruction. The door controller commands operation of the adjustment actuator based on the sensed distance.

Additionally or alternatively, in this or other embodiments the door controller is operably connected to one or more preprogrammed memory features of the vehicle to operate the adjustment actuator based on one or more of seat position, side mirror position or steering column position of the vehicle.

Additionally or alternatively, in this or other embodiments the adjustment actuator is an electric motor.

In another embodiment, a vehicle includes a vehicle body, a door operably connected to the vehicle body and movable between a closed position and an opened position via one or more hinges, and a door check system. The door check system includes a door check assembly including a check body secured to the door, a check link extending through a check body opening of the check body, and an adjustment mechanism located at the vehicle body. The adjustment mechanism includes a housing defining a housing opening, and an adjustment slide located in the housing opening and slidable moveable therein. The adjustment slide is secured to the check link. An adjustment feature is secured to the adjustment slide and extends through an adjustment slot in the housing. Moving the adjustment feature along the adjustment slot moves the adjustment slide in the housing opening to change an effective length of the check link.

Additionally or alternatively, in this or other embodiments an adjustment actuator is operably connected to the adjustment feature to urge movement of the adjustment feature along the adjustment slot.

Additionally or alternatively, in this or other embodiments a linkage connects the adjustment actuator to the adjustment feature.

Additionally or alternatively, in this or other embodiments the linkage is positioned on an output arm of the adjustment actuator.

Additionally or alternatively, in this or other embodiments a door controller is operably connected to the adjustment actuator to control operation of the adjustment actuator.

Additionally or alternatively, in this or other embodiments a door sensor senses a distance between the door and an obstruction. The door controller commands operation of the adjustment actuator based on the sensed distance.

Additionally or alternatively, in this or other embodiments the door controller is operably connected to one or more preprogrammed memory features of the vehicle to operate the adjustment actuator based on one or more of seat position, side mirror position or steering column position of the vehicle.

Additionally or alternatively, in this or other embodiments the adjustment actuator is an electric motor.

In yet another embodiment, a method of adjusting an opening angle of a vehicle door includes detecting a distance between the vehicle door and an obstruction, and adjusting an effective length of a door check link of a door check system of the vehicle, thus adjusting the opening angle. The adjusting includes slidably positioning an adjustment slide in a housing opening of the door check system, the adjustment slide secured to the check link. The adjustment slide is moved in response to the detected distance thus adjusting the effective length.

Additionally or alternatively, in this or other embodiments an adjustment actuator is operably connected to the adjustment slide to urge movement of the adjustment slide.

Additionally or alternatively, in this or other embodiments a door controller is operably connected to the adjustment actuator to control operation of the adjustment actuator.

Additionally or alternatively, in this or other embodiments the door controller is operably connected to one or more preprogrammed memory features of the vehicle to operate the adjustment actuator based on one or more of seat position, side mirror position or steering column position of the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
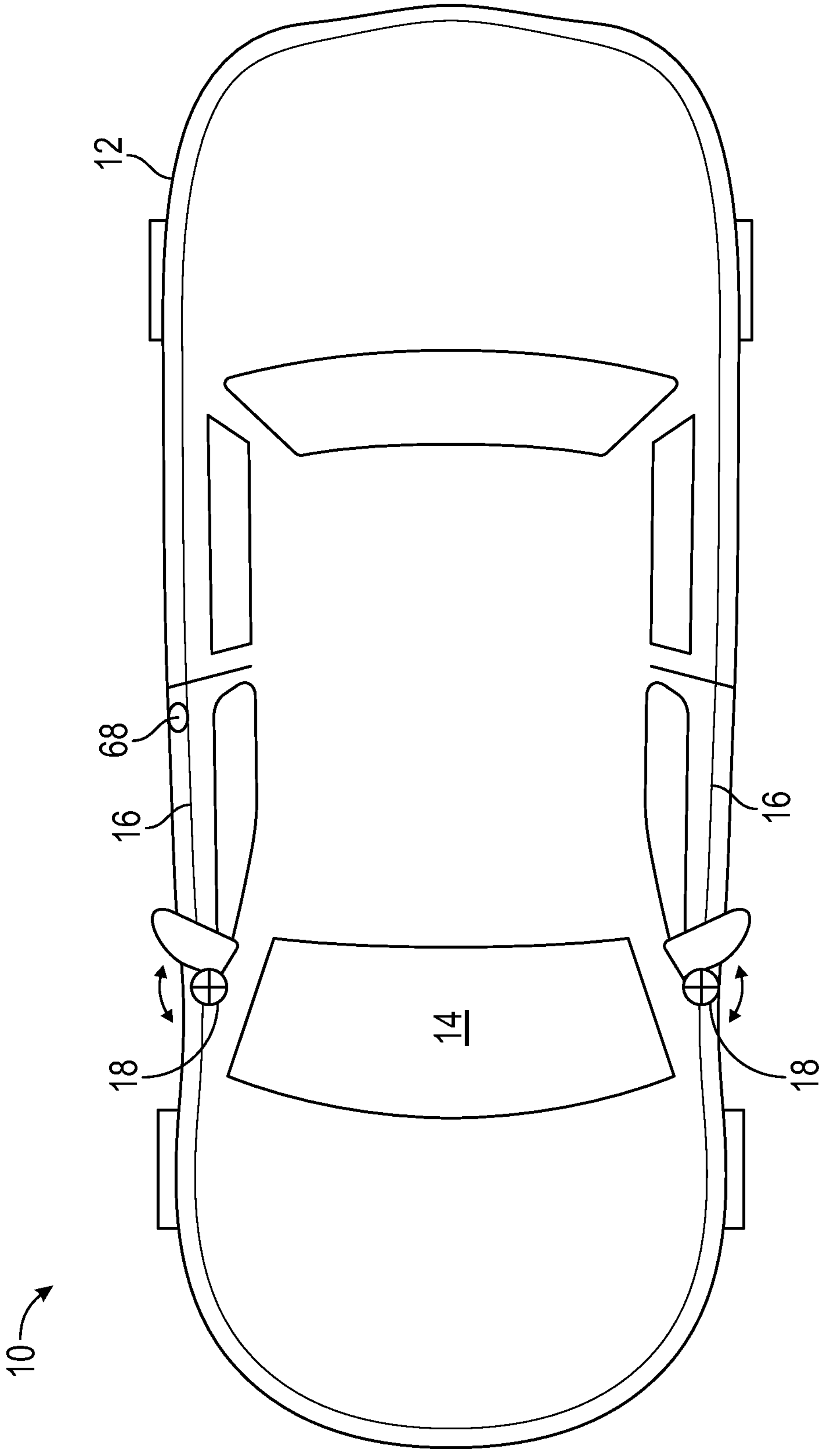
FIG. 1 is an illustration of an embodiment of a vehicle.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 that defines an occupant compartment 14. The vehicle 10 further includes one or more doors 16 rotatable about a hinge axis 18 of the door 16.

Figure 2:
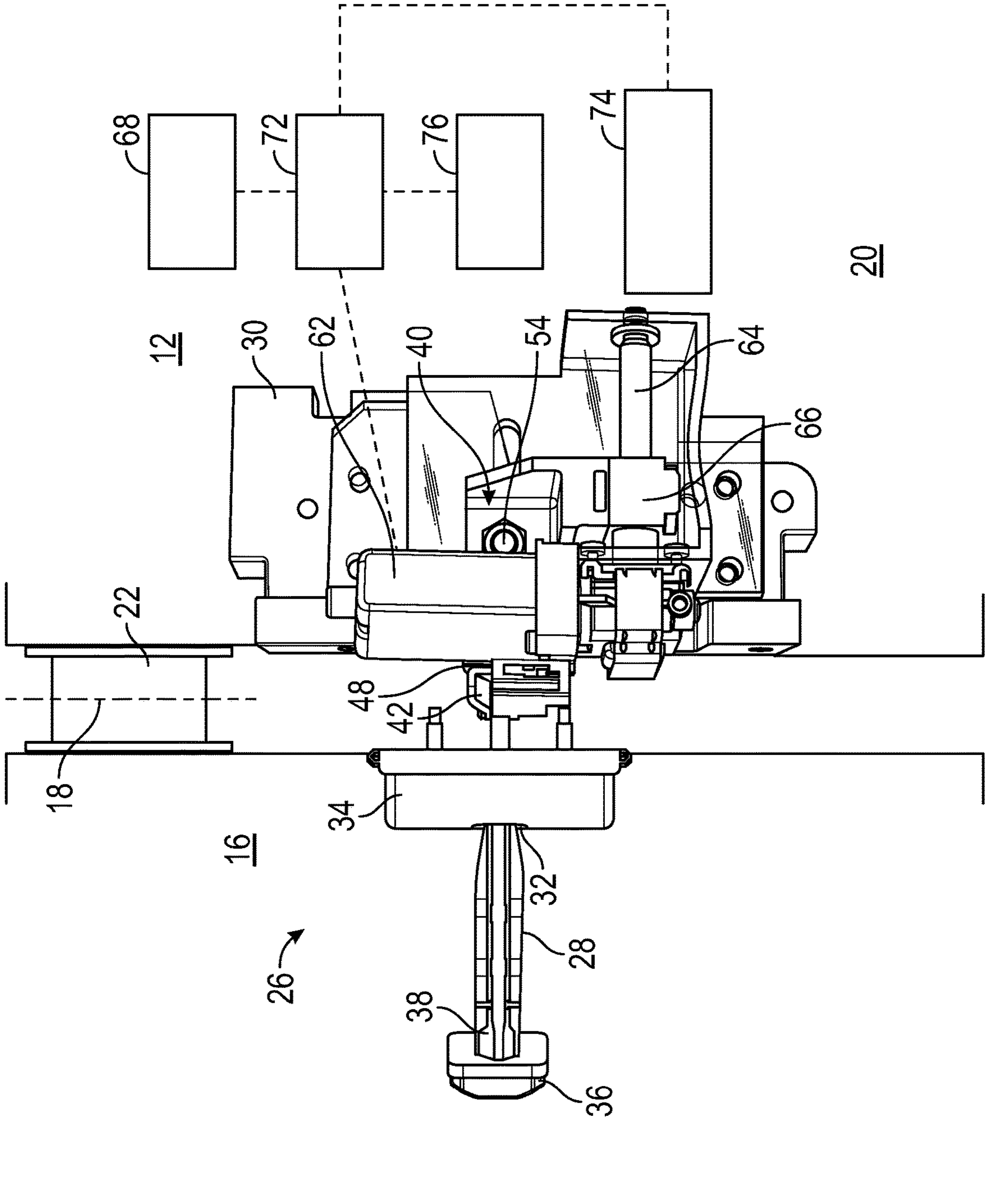
FIG. 2 is an illustration of an embodiment of a door and a door opening of a vehicle.
Figure 3:
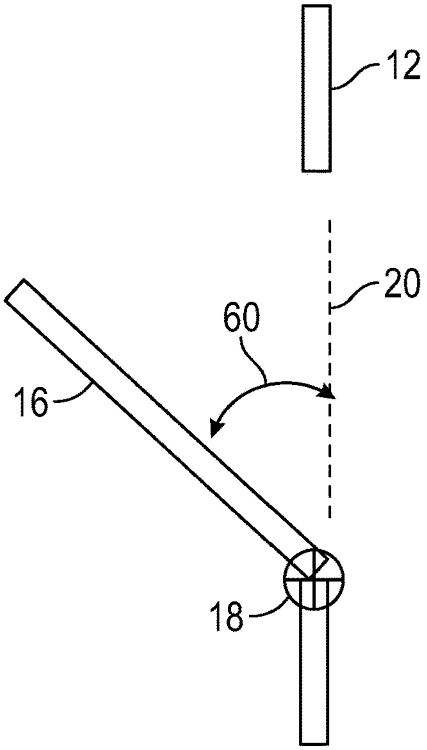
FIG. 3 is a schematic illustration of a vehicle with a door in a fully opened position.
Figure 4:
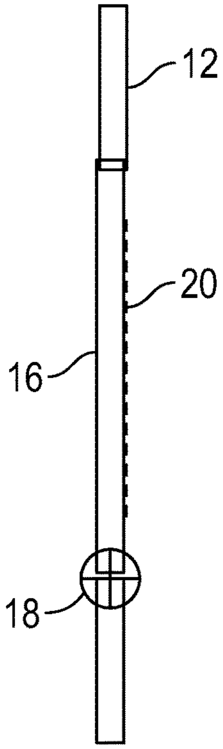
FIG. 4 is a schematic illustration of a vehicle with a door in a closed position.

Referring now to FIG. 2, each door 16 is assembled to the body 12 at a door opening 20 via one or more hinges 22, such that the door 16 is movable in the door opening 20 about the hinge axis 18 of the one or more hinges 22 between an open position as shown in FIG. 3 and a closed position as shown in FIG. 4. Referring again to FIG. 2, a door check assembly 26 extends between the door 16 and the body 12. The door check assembly 26 includes a check link 28 that extends between a body frame 30 at the door opening 20 and the door 16. The check link 28 extends through a check body opening 32 of a check body 34 that is installed to the door 16, and is retained in the check body opening 32 by a check stop 36 disposed at a first link end 38 of the check link 28. An adjustment mechanism 40 is disposed at the door opening 20 and the check link 28 is secured to the adjustment mechanism 40 at a second link end 42 opposite the first link end 38.

Figure 5:
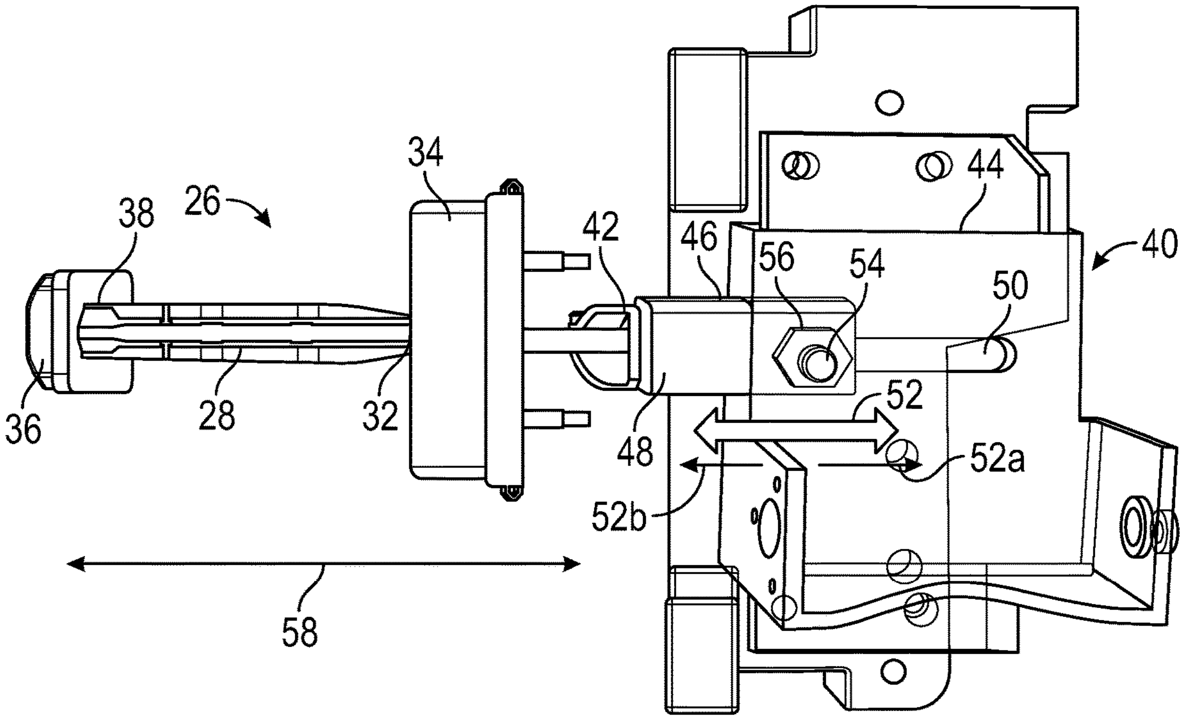
FIG. 5 is a schematic illustration of an embodiment of a door check assembly for a vehicle door.

Referring now to FIG. 5, the adjustment mechanism 40 will be described in further detail. The adjustment mechanism 40 includes a housing 44 having a housing opening 46 in which an adjustment slide 48 is disposed. Further, the housing 44 includes an adjustment slot 50. The adjustment slot 50 extends in an adjustment direction 52 along the housing 44. An adjustment feature is secured to the adjustment slide, and in some embodiments includes a slide bolt 54 and a slide nut 56. The slide bolt 54 extends from the adjustment slide 48 and through the adjustment slot 50, with the slide bolt 54 having the slide nut 56 installed thereto to retain the adjustment slide 48 at the adjustment slot 50. The adjustment slide 48 is movable in the adjustment direction 52 along the adjustment slot 50 to change an effective length 58 of the check link 28, which in turn changes a fully open position of the door 16. When the effective length 58 is shortened by moving the adjustment slide 48 in a first adjustment direction 52*a*, an open angle 60 when the door 16 is in the fully open position, shown in FIG. 3, is reduced, while when the effective length 58 is increased by moving the adjustment slide 48 in a second adjustment direction 52*b*, the open angle 60 is increased.

To control the position of the adjustment slide 48 in the adjustment slot 50, the adjustment slide 48 is connected to an adjustment actuator, such as an electric motor 62, which in some embodiments is a 12 volt DC motor, as shown in FIG. 2. The electric motor 62 includes an output arm 64 secured in the housing 44. A linkage 66 is disposed on the output arm 64 and is connected to the adjustment slide 48 via the slide bolt 54. The linkage 66 connection of the electric motor 62 to the adjustment slide 48 allows the operation of the electric motor 62 to move the adjustment slide 48 in the adjustment direction along the adjustment slot 50 thus changing the effective length 58 of the check link 28 resulting in a change to the open angle 60.

In some embodiments, as shown in FIG. 1, the door 16 includes a door sensor 68 at an exterior of the door 16. The door sensor 68 is configured to detect a distance between the door 16 and an obstruction, such as another vehicle, a pole, or other structure. As shown in FIG. 2, the door sensor 68 is operably connected to a door controller 72, which utilizes the detected distance to determine an optimal position of the adjustment slide 48. The door controller 72 then signals the electric motor 62 to operate to position the adjustment slide 48 to the optimal position. In some embodiments, the door controller 72 is operably connected to a slide potentiometer 74 disposed at the adjustment slide 48 to aide in correlating position of the adjustment slide 48 to the fully open position of the door 16. Further, in some embodiments, the door controller 72 is connected to one or more vehicle systems 76, such as preprogrammed memory features for, for example, seat position, side mirror position or steering column positioning to adjust the door check 26 based on the seat position, side mirror position or the steering column position.

The door check assembly 26 and the adjustment mechanism 40 disclosed herein allow for adjustment of the full open position of the door 16, which prevents damage to the door 16 due to hitting obstructions when opening the door 16, and also may make the door easier to close depending on a seated occupant's ability to reach the door.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A door check system of a vehicle, comprising:

a door check assembly including;

a check body securable to a door of the vehicle;

a check link extending through a check body opening of the check body; and an adjustment mechanism disposed at a body of the vehicle, the adjustment mechanism including:

a housing defining a housing opening;

an adjustment slide disposed in the housing opening and slidably moveable therein, the adjustment slide secured to the check link; and an adjustment feature secured to the adjustment slide and extending through an adjustment slot in the housing;

wherein moving the adjustment feature along the adjustment slot moves the adjustment slide in the housing opening to change an effective length of the check link;

an adjustment actuator operably connected to the adjustment feature to urge movement of the adjustment feature along the adjustment slot; and a linkage connecting the adjustment actuator to the adjustment feature.

2. The door check system of claim 1, wherein the linkage is disposed on an output arm of the adjustment actuator.

3. The door check system of claim 1, further comprising a door controller operably connected to the adjustment actuator to control operation of the adjustment actuator.

4. The door check system of claim 3, further comprising a door sensor to sense a distance between the door and an obstruction, wherein the door controller commands operation of the adjustment actuator based on the sensed distance.

5. The door check system of claim 4, wherein the door controller is operably connected to one or more preprogrammed memory features of the vehicle to operate the adjustment actuator based on one or more of seat position, side mirror position or steering column position of the vehicle.

6. The door check system of claim 1, wherein the adjustment actuator is an electric motor.

7. A vehicle comprising;
a vehicle body;
a door operably connected to the vehicle body and movable between a closed position and an opened position via one or more hinges; and
a door check system, including:
a door check assembly including;
a check body secured to the door;
a check link extending through a check body opening of the check body; and
an adjustment mechanism disposed at the vehicle body, the adjustment mechanism including:
a housing defining a housing opening;
an adjustment slide disposed in the housing opening and slidably moveable therein, the adjustment slide secured to the check link; and
an adjustment feature secured to the adjustment slide and extending through an adjustment slot in the housing;
wherein moving the adjustment feature along the adjustment slot moves the adjustment slide in the housing opening to change an effective length of the check link;
an adjustment actuator operably connected to the adjustment feature to urge movement of the adjustment feature along the adjustment slot; and
a linkage connecting the adjustment actuator to the adjustment feature.

8. The vehicle of claim 7, wherein the linkage is disposed on an output arm of the adjustment actuator.

9. The vehicle of claim 7, further comprising a door controller operably connected to the adjustment actuator to control operation of the adjustment actuator.

10. The vehicle of claim 9, further comprising a door sensor to sense a distance between the door and an obstruction, wherein the door controller commands operation of the adjustment actuator based on the sensed distance.

11. The vehicle of claim 10, wherein the door controller is operably connected to one or more preprogrammed memory features of the vehicle to operate the adjustment actuator based on one or more of seat position, side mirror position or steering column position of the vehicle.

12. The vehicle of claim 7 wherein the adjustment actuator is an electric motor.

13. A method of adjusting an opening angle of a vehicle door, comprising:
detecting a distance between the vehicle door and an obstruction; and
adjusting an effective length of a door check link of a door check system of the vehicle, thus adjusting the opening angle, the adjusting including:
slidably positioning an adjustment slide in a housing opening of the door check system, the adjustment slide secured to the check link; and
moving the adjustment slide in response to the detected distance thus adjusting the effective length;
wherein an adjustment actuator is operably connected to the adjustment slide to urge movement of the adjustment slide; and
a door controller is operably connected to the adjustment actuator to control operation of the adjustment actuator.

14. The method of claim 13, wherein the door controller is operably connected to one or more preprogrammed memory features of the vehicle to operate the adjustment actuator based on one or more of seat position, side mirror position or steering column position of the vehicle.

15. The method of claim 13, wherein the adjustment actuator is operably connected to the adjustment slide via a linkage.

16. The method of claim 15, wherein the linkage is disposed on an output arm of the adjustment actuator.

17. The method of claim 13, wherein the adjustment actuator is an electric motor.

18. The method of claim 13, wherein:
moving the adjustment slide in a first direction increases the effective length of the door check; and
moving the adjustment slide in a second direction opposite the first direction decreases the effective length of the door check.

19. The door check system of claim 1, wherein the adjustment mechanism is configured such that:
moving the adjustment slide in the housing opening in a first direction increases the effective length of the check link; and
moving the adjustment slide in the housing opening in a second direction opposite the first direction decreases the effective length of the check link.

20. The vehicle of claim 7, wherein the adjustment mechanism is configured such that:
moving the adjustment slide in the housing opening in a first direction increases the effective length of the check link; and
moving the adjustment slide in the housing opening in a second direction opposite the first direction decreases the effective length of the check link.

* * * * *